(12) United States Patent
He et al.

(10) Patent No.: US 12,417,860 B2
(45) Date of Patent: Sep. 16, 2025

(54) SILVER-COPPER COMPOSITE CONDUCTIVE PASTE CAPABLE OF BEING SINTERED AT LOW TEMPERATURE AND PREPARATION METHOD AND USE THEREOF

(71) Applicant: Foshan University, Foshan (CN)

(72) Inventors: Haiying He, Shenzhen (CN); Li Hu, Chengdu (CN); Zhihao Yang, East Brunswick, NJ (US); Wanying Zou, Foshan (CN); Jianzhang Lv, Guangzhou (CN)

(73) Assignee: Foshan University, Foshan (CN)

( * ) Notice: Subject to any disclaimer, the term of this patent is extended or adjusted under 35 U.S.C. 154(b) by 0 days.

(21) Appl. No.: 19/031,130

(22) Filed: Jan. 17, 2025

(65) Prior Publication Data

US 2025/0166864 A1  May 22, 2025

Related U.S. Application Data

(63) Continuation of application No. PCT/CN2024/070668, filed on Jan. 4, 2024.

(30) Foreign Application Priority Data

Apr. 19, 2023  (CN) .......................... 202310418843.2

(51) Int. Cl.
*H01B 1/22* (2006.01)
*B22F 1/0545* (2022.01)
(Continued)

(52) U.S. Cl.
CPC ............ *H01B 1/22* (2013.01); *B22F 1/0545* (2022.01); *B22F 1/065* (2022.01); *B22F 1/107* (2022.01);
(Continued)

(58) Field of Classification Search
CPC ....................................................... H01B 1/22
See application file for complete search history.

(56) References Cited

U.S. PATENT DOCUMENTS

2020/0108471 A1*  4/2020  Ishikawa .............. B23K 35/302

FOREIGN PATENT DOCUMENTS

| CN | 107221373 A | 9/2017 |
|---|---|---|
| CN | 107921540 A | 4/2018 |
| KR | 20010106951 A | 12/2001 |

* cited by examiner

*Primary Examiner* — William D Young
(74) *Attorney, Agent, or Firm* — Nitin Kaushik (57) ABSTRACT

The invention belongs to the technical field of packaging interface materials for electronic power devices, and particularly discloses a silver-copper composite conductive paste capable of being sintered at a low temperature, and a preparation method and use thereof. A first purpose of the invention is to provide a silver-copper composite conductive paste capable of being sintered at a low temperature, comprising, by weight, the following components: 20-80% of micro-copper particles; 10-60% of nano-silver sheets; 1-20% of nano-silver particles; and 10% of an organic carrier. The silver-copper composite conductive paste capable of being sintered at a low temperature provided by the invention adopts silver and copper of different sizes and morphologies, large-sized sliver sheets and micro-copper particles are used as skeletons, and small nano-silver particles are used for filling, such that gaps are reduced, and the performance is improved.

7 Claims, 7 Drawing Sheets

(51) Int. Cl.
 *B22F 1/065* (2022.01)
 *B22F 1/107* (2022.01)
(52) U.S. Cl.
 CPC ..... *B22F 2301/10* (2013.01); *B22F 2301/255* (2013.01); *B22F 2304/054* (2013.01); *B22F 2304/058* (2013.01)

SILVER-COPPER COMPOSITE CONDUCTIVE PASTE CAPABLE OF BEING SINTERED AT LOW TEMPERATURE AND PREPARATION METHOD AND USE THEREOF

CROSS-REFERENCE TO RELATED APPLICATIONS

The application claims priority to Chinese patent application No. 202310418843.2, filed on Apr. 19, 2023, the entire contents of which are incorporated herein by reference.

TECHNICAL FIELD

The invention relates to the technical field of packaging interface materials for electronic power devices, in particular to a silver-copper composite conductive paste capable of being sintered at a low temperature and a preparation method and use thereof.

BACKGROUND

Driven by the demand of new energy (electric vehicles, wind power and photovoltaic energy), industrial engineering, power supplies, frequency conversion and IoT equipment, third-generation semiconductor silicon carbide and gallium nitride will dominate the market of power devices in the future. Because silicon carbide and gallium nitride are generally used in severe high-temperature or high-irradiance conditions, the requirements for packaging materials are higher than the requirements of traditional semiconductor devices or integrated circuits, and packaging materials for power devices should have a good thermal conductivity.

At present, traditional packaging materials are sintered at a high temperature, which will inevitably cause some physical damage to substrate devices. Nano-silver particles not only can realize low-temperature sintering, but also can avoid the growth of intermetallic compounds caused by an excessively high temperature, thus having good application prospects. The technique of realizing low-temperature sintering with nano-silver has been reported previously. However, the previous study has the problem of an excessively high cost caused by the use of nano-silver; and water-based solvents used are easy to volatilize, which is not beneficial to large-scale industrial application. The addition of copper can effectively reduce the cost and improve the performance of pastes.

For example, Chinese Patent Application No. CN202110494206.4 discloses a glass frit, a conductive paste and a use of the conductive paste in preparation of a ceramic dielectric filter electrode. The conductive paste mainly comprises a glass frit, an organic carrier and conductive particles; the conductive particles comprise silver powder and copper powder; the silver powder comprises flake-like silver powder, nano-silver powder, and spherical silver powder with a particle size of 0.8-1.6 m, wherein the flake-like sliver powder accounts for 7-15% of the total mass of silver powder, and the nano-silver powder accounts for 3-7% of the total mass of the silver powder; and the conductive paste will form a laminated structure with good compactness, a high Q value and a smooth surface during the curing process. Although the conductive paste is prepared from nano-silver powder, micro-silver sheets, micro-silver particles and a small amount of copper powder, the proportion of the copper powder in metal particles is small, leading to a high cost; in addition, due to the presence of high-melting-point materials in the paste such as the glass material, the sintering temperature is increased greatly.

For another example, Chinese Patent Application No. CN202210779926.X discloses a silver-coated copper silver paste and a preparation method thereof. The silver-coated copper silver paste comprises, by weight, 22-25 parts of micro-silver powder, 40-50 parts of nano-silver powder, 20-22 parts of silver-coated copper powder, 2.5-9 parts of epoxy resin, 0.1-0.5 parts of an epoxy curing accelerator, 2-4 parts of an organic solvent, and 0.5-1 parts of a silane coupling agent. The preparation method of the silver-coated copper silver paste comprises: accurately weighing all components, and sequentially mixing and stirring the components to obtain a silver-carbon hybrid paste. The silver-coated copper silver paste can reduce the production cost of silver pastes and improve the electrical conductivity of silver pastes, thus expanding the application range of HJT heterojunction solar cells. Although the silver-coated copper silver paste can be cured at a low temperature, it has a high electrical resistivity which reaches $1\times10^{-5}$ Ωcm; and the silver-coated copper powder is difficult to prepare, leading to a complex process.

SUMMARY

To solve the above technical problems, the invention provides a silver-copper composite conductive paste capable of being sintered at a low temperature and a preparation method and use thereof.

To fulfill the above purposes, the invention is implemented according to the following technical solutions:

A first purpose of the invention is to provide a silver-copper composite conductive paste capable of being sintered at a low temperature, comprising, by weight, the following components:

20-80% of micro-copper particles;
10-60% of nano-silver sheets;
1-20% of nano-silver particles; and
1-10% of an organic carrier.

Further, the micro-copper particles are spherical and have a mean particle size of 1-10 μm.

Further, the nano-silver sheets are flake-like, have a plane mean diameter of 100-2000 nm and a mean thickness of 5-500 nm, and the ratio of a flake-like plane diameter to a thickness of the nano-silver sheets is greater than 2.

Further, the nano-silver particles are spherical and have a mean particle size of 1-100 nm.

Further, the organic carrier is a single organic solvent or a component organic solvent comprising one or more of 1, 2 propylene glycol, ethylene glycol, terpilenol and DBE.

Further, the organic carrier further comprises one or more of an organic resin, a rheological agent and a surface active agent, and the weight percentage of the one or more of the organic resin, the rheological agent and the surface active agent in the organic carrier is 0-3%.

Preferably, the mean particle size of the nano-silver particles is 3-8 nm.

A second purpose of the invention is to provide a preparation method of the silver-copper composite conductive paste capable of being sintered at a low temperature, comprising the following steps:

weighing, according to weight percentages, micro-copper particles, nano-silver sheets, nano-silver particles and an organic carrier, adding the micro-copper particles, the nano-silver sheets and the nano-silver particles into the organic carrier, and uniformly grinding with a mortar or a three-roller mill to obtain the silver-copper composite conductive paste capable of being sintered at a low temperature.

A third purpose of the invention is to provide a use of the silver-copper composite conductive paste capable of being sintered at a low temperature as a chip packaging and connecting material of a power semiconductor device. Specifically, the silver-copper composite conductive paste capable of being sintered at a low temperature is packaged on a chip of a semiconductor device by a hot-pressing process under a pressure of 0.1 MPa-1 MPa, a sintering temperature of 180-250° C., a sintering time of 15-30 min, and a holding time of 10 min.

Compared with the prior art, the invention has the following beneficial effects:

The silver-copper composite conductive paste capable of being sintered at a low temperature provided by the invention adopts silver and copper of different sizes and morphologies, large-sized sliver sheets and micro-copper particles are used as skeletons, and small nano-silver particles are used for filling, such that gaps are reduced, and the performance is improved.

The silver-copper composite conductive paste capable of being sintered at a low temperature provided by the invention adopts a large quantity of micro-copper particles, such that the thermal conductivity and electrical conductivity of the paste are improved, and the cost is effectively reduced.

Due to the addition of small nano-sliver particles, the silver-copper composite conductive paste capable of being sintered at a low temperature provided by the invention can be sintered at a low temperature, and the sintering temperature of the silver-copper composite conductive paste is 180-250° C. and is lower than the sintering temperature of traditional device packaging materials.

Due to the addition of an organic solvent with a boiling point below 250° C. to the silver-copper composite conductive paste capable of being sintered at a low temperature provided by the invention, the organic solvent can be completely decomposed and volatilized at a sintering temperature of 180-250° C., thus reducing the influence of organic matter on the performance of the silver-copper composite conductive paste.

DETAILED DESCRIPTION OF THE EMBODIMENTS

To gain a better understanding of the purposes, technical solutions and advantages of the invention, the invention is described in further detail below in conjunction with embodiments. The specific embodiments described here are merely used for explaining the invention and are not intended to limit the invention.

Information of reagents used in the following embodiments is shown in Table 1, and all experimental apparatuses used are market-available, unless otherwise specially stated.

Figure 1:
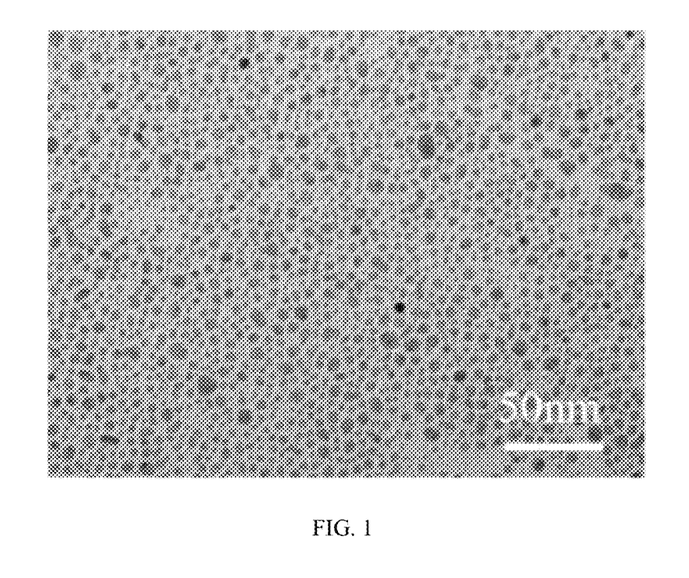
FIG. 1 is a TEM image of nano-silver particles added in Embodiments 1-4 and Comparative Embodiment 1.
Figure 2:
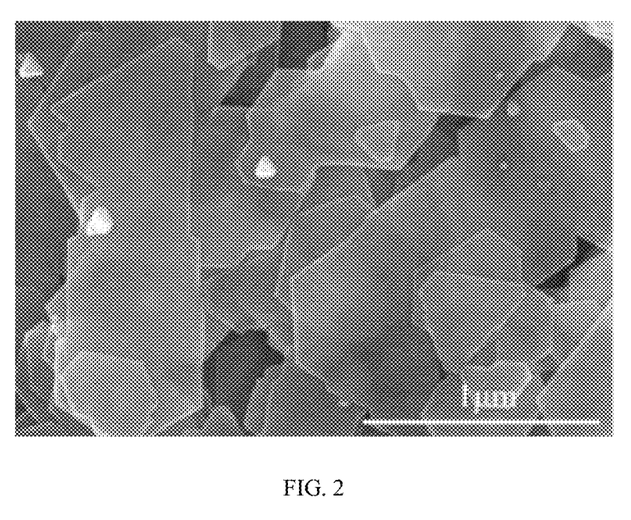
FIG. 2 is an SEM image of nano-silver sheets added in Embodiments 1-4 and Comparative Embodiment 1.
Figure 3:
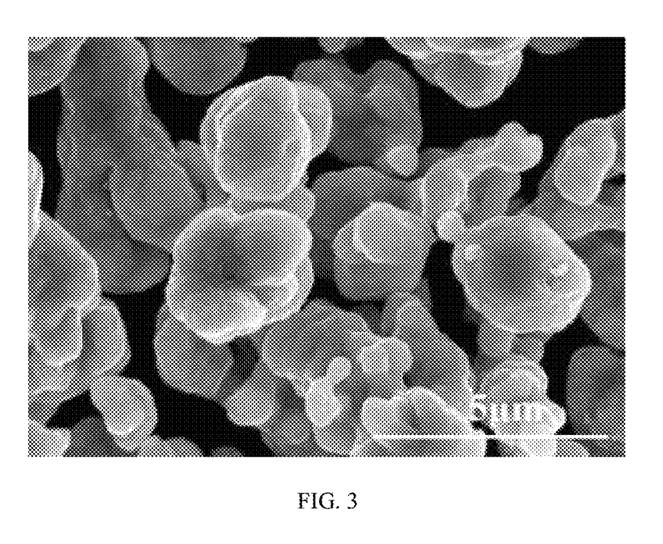
FIG. 3 is an SEM image of micro-copper particles added in Embodiments 1-4.

Wherein, the morphology and size of nano-silver particles are shown in FIG. 1, the morphology and size of nano-silver sheets are shown in Table 2, and the morphology and size of micro-copper particles are shown in FIG. 3.

TABLE 1

| Name of materials | Chemical formula | Purity | Produced by |
| --- | --- | --- | --- |
| Nano-silver particles | Mixture | \ | By us |
| Nano-silver sheets | Mixture | \ | By us |
| Micro-copper particles | Mixture | \ | Beijing Shangye New Materials Technology Co., Ltd. |
| 1,2 propylene glycol | $C_3H_8O_2$ | AR | Shanghai Aladdin Biochemical Technology Co., Ltd. |
| Ethylene glycol | $C_2H_6O_2$ | AR | Shanghai Aladdin Biochemical Technology Co., Ltd. |
| Terpilenol | $C_{10}H_{18}O$ | 95% | Shanghai Aladdin Biochemical Technology Co., Ltd. |
| DBE | Mixture | \ | Dongguan Xindu Chemical Co., Ltd. |

Embodiment 1

10 g of terpilenol was weighed (the main component of an organic carrier is terpilenol, and 0-3 of an organic resin, a rheological agent or a surface active agent may be added as needed to adjust physical properties of a paste under the process condition), and then 10 g of nano-silver particles with a particle size of 3-8 nm were added into the terpilenol; 20 g of nano-silver sheets with a side length of 300-800 nm and a thickness of 30-80 nm were added; and 60 g of micro-copper powder with a size of 2-8 m was added, and then a resulting mixture was uniformly ground with a mortar to obtain a silver-copper composite conductive paste capable of being sintered at a low temperature.

Embodiment 2

10 g of DBE was weighed (the main component of an organic carrier is DBE, and 0-3% of an organic resin, a rheological agent or a surface active agent may be added as needed to adjust physical properties of a paste under the process condition), and then 10 g of nano-silver particles with a particle size of 3-8 nm were added into the DBE; 20 g of nano-silver sheets with a side length of 300-800 nm and a thickness of 30-80 nm were added; and 60 g of micro-copper powder with a size of 2-8 m was added, and then a resulting mixture was uniformly ground with a mortar to obtain a silver-copper composite conductive paste capable of being sintered at a low temperature.

Embodiment 3

10 g of ethylene glycol was weighed (the main component of an organic carrier is ethylene glycol, and 0-3% of an organic resin, a rheological agent or a surface active agent may be added as needed to adjust physical properties of a paste under the process condition), and then 10 g of nano-silver particles with a particle size of 3-8 nm were added into the ethylene glycol; 20 g of nano-silver sheets with a side length of 300-800 nm and a thickness of 30-80 nm were added; and 60 g of micro-copper powder with a size of 2-8 m was added, and then a resulting mixture was uniformly ground with a mortar to obtain a silver-copper composite conductive paste capable of being sintered at a low temperature.

Embodiment 4

10 g of 1, 2 propylene glycol was weighed (the main component of an organic carrier is 1, 2 propylene glycol, and 0-3% of an organic resin, a rheological agent or a surface active agent may be added as needed to adjust physical properties of a paste under the process condition), and then 10 g of nano-silver particles with a particle size of 3-8 nm were added into the 1, 2 propylene glycol; 20 g of nano-silver sheets with a side length of 300-800 nm and a thickness of 30-80 nm were added; and 60 g of micro-copper powder with a size of 2-8 m was added, and then a resulting mixture was uniformly ground with a mortar to obtain a silver-copper composite conductive paste capable of being sintered at a low temperature.

Comparative Embodiment 1

10 g of 1, 2 propylene glycol was weighed (the main component of an organic carrier is 1, 2 propylene glycol, and 0-3% of an organic resin, a rheological agent or a surface active agent may be added as needed to adjust physical properties of a paste under the process condition), and then 30 g of nano-silver particles with a particle size of 3-8 nm were added into the 1, 2 propylene glycol; and 60 g of nano-silver sheets with a side length of 300-800 nm and a thickness of 30-80 nm were added, and then a resulting mixture was uniformly ground with a mortar to obtain a silver-copper composite conductive paste capable of being sintered at a low temperature.

Further, to verify whether the silver-copper composite conductive pastes capable of being sintered at a low temperature prepared in Embodiments 1-4 and Comparative Embodiment 1 can be used as a chip packaging and connecting material of a power semiconductor device, and the silver-copper composite conductive pastes capable of being sintered at a low temperature prepared in Embodiments 1-4 and Comparative Embodiment 1 were made into samples by a hot-pressing process specifically as follows.

Embodiment 5

Figure 4:
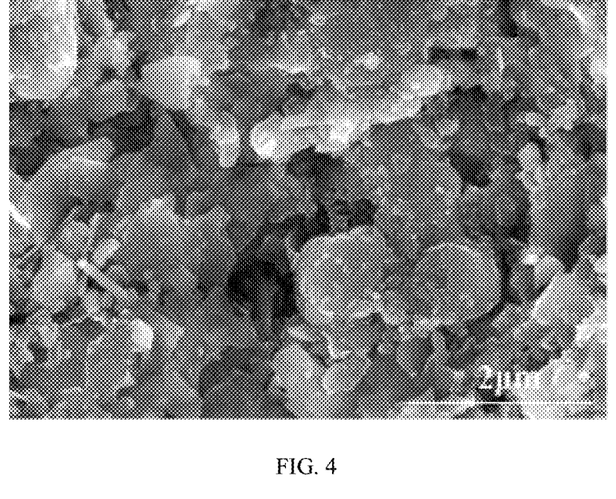
FIG. 4 is a microstructural SEM image of a sintered sample in Embodiment 5.

The silver-copper composite conductive paste capable of being sintered at a low temperature prepared in Embodiment 1 was sintered for 20 min with a mold and a hot press at a pressure of 0.5 MPa and a temperature of 200° C.; and after sintering was ended, the pressure was released, and the temperature was held for 10 min to obtain a sample A. A microstructural image of the sintered sample A is shown in FIG. 4.

Embodiment 6

Figure 5:
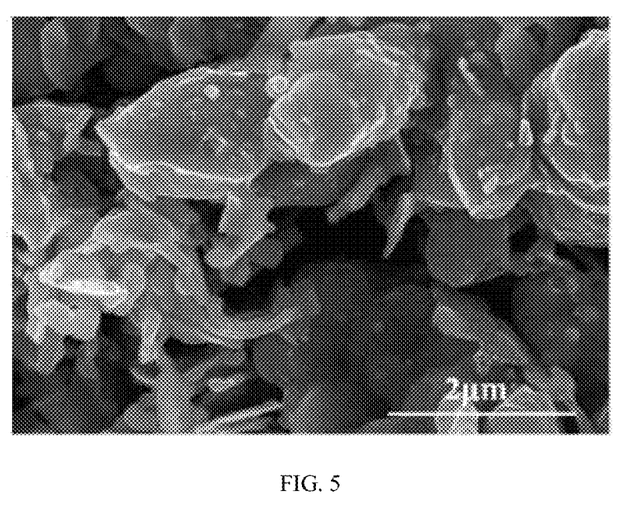
FIG. 5 is a microstructural SEM image of a sintered sample in Embodiment 6.

The silver-copper composite conductive paste capable of being sintered at a low temperature prepared in Embodiment 2 was sintered for 20 min with a mold and a hot press at a pressure of 0.5 MPa and a temperature of 200° C.; and after sintering was ended, the pressure was released, and the temperature was held for 10 min to obtain a sample B. A microstructural image of the sintered sample B is shown in FIG. 5.

Embodiment 7

Figure 6:
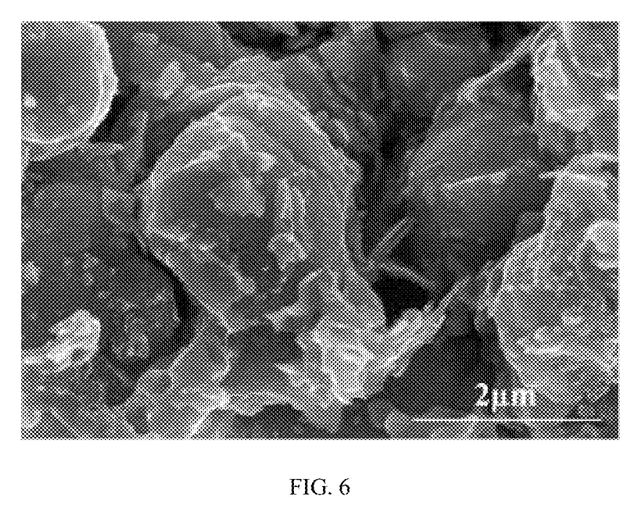
FIG. 6 is a microstructural SEM image of a sintered sample in Embodiment 7.

The silver-copper composite conductive paste capable of being sintered at a low temperature prepared in Embodiment 3 was sintered for 20 min with a mold and a hot press at a pressure of 0.5 MPa and a temperature of 200° C.; and after sintering was ended, the pressure was released, and the temperature was held for 10 min to obtain a sample C. A microstructural image of the sintered sample C is shown in FIG. 6.

Embodiment 8

Figure 7:
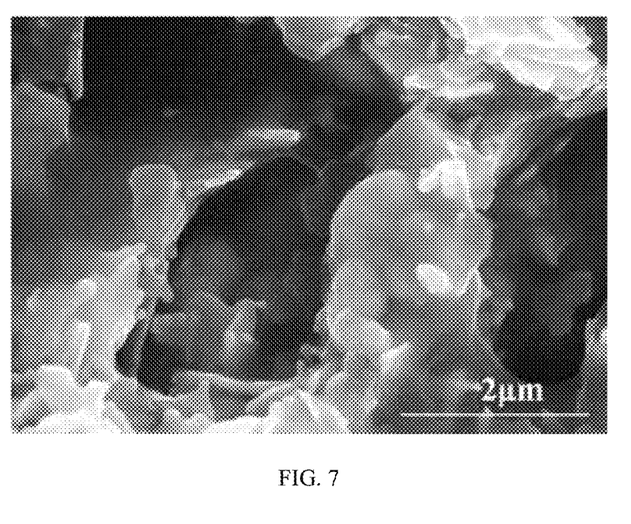
FIG. 7 is a microstructural SEM image of a sintered sample in Embodiment 8.

The silver-copper composite conductive paste capable of being sintered at a low temperature prepared in Embodiment 4 was sintered for 20 min with a mold and a hot press at a pressure of 0.5 MPa and a temperature of 200° C.; and after sintering was ended, the pressure was released, and the temperature was held for 10 min to obtain a sample D. A microstructural image of the sintered sample D is shown in FIG. 7.

Comparative Embodiment 2

The silver-copper composite conductive paste capable of being sintered at a low temperature prepared in Comparative Embodiment 1 was sintered for 20 min with a mold and a hot press at a pressure of 0.5 MPa and a temperature of 200° C.; and after sintering was ended, the pressure was released, and the temperature was held for 10 min to obtain a sample E.

It can be seen from FIGS. 4-7 that the nano-silver sheets were melted to different degrees because of the addition of small nano-silver particles. The nano-silver with an extremely small size has an extremely large specific surface area and an extremely high surface activity, can greatly lower the melting point by means of the size effect, and can form eutectic melting together with the nano-silver sheets, thus promoting melting of the nano-silver sheets; moreover, the nano-size effect forms a synergistic effect with nano-copper and forms heat-conduction channels with the micro-copper particles, and the thermal conductivity and electrical conductivity of the samples will be improved with the increase of the number of such connecting structures.

The samples obtained in Embodiments 5-8 and Comparative Embodiment 2 were sent to Shanghai Weipu Detection Technology Co., Ltd., and the thermal conductivity of the samples was tested according to the standard ASTM E1461-2013; the electrical resistivity was tested by means of an electrical transport property measurement system produced by us, then the electrical conductivity which is a reciprocal of the electrical resistivity was obtained by calculation, and the results are shown in Table 2.

TABLE 2

| | Name of samples | Solvents | Thermal conductivity (W/mK) | Electrical conductivity (S/m) |
|---|---|---|---|---|
| Embodiment 5 | A | terpilenol | 104.788 | $1.438 * 10^7$ |
| Embodiment 6 | B | DBE | 182.390 | $2.096 * 10^7$ |
| Embodiment 7 | C | Ethylene glycol | 152.442 | $1.986 * 10^7$ |
| Embodiment 8 | D | 1,2 propylene glycol | 249.415 | $2.686 * 10^7$ |

TABLE 2-continued

| Name of samples | Solvents | Thermal conductivity (W/mK) | Electrical conductivity (S/m) |
|---|---|---|---|
| Embodiment 2 | E | 1,2 propylene glycol | 128.017 | 1.878 * 10⁷ |

It can be known from data in a e that the silver-copper composite conductive paste capable of being sintered at a low temperature prepared in the invention has a good thermal conductivity and electrical conductivity after being sintered, thus having a broad development prospect in the application of power electronic devices and providing a new idea for packaging materials; and the silver-copper composite conductive paste capable of being sintered at a low temperature can have different properties by adding different organic solvents, and when the 1, 2 propylene glycol is used as an organic solvent, the silver-copper composite conductive paste capable of being sintered at a low temperature has the optimal thermal conductivity and electrical conductivity.

To sum up, the silver-copper composite conductive paste capable of being sintered at a low temperature prepared by the invention has a good thermal conductivity and electrical conductivity after being sintered at a low temperature, and thus can be used as a chip packaging and connecting material for power semiconductor devices.

The technical solutions of the invention are not limited to the above specific embodiments. All technical transformations made based on the technical solutions of the invention should fall within the protection scope of the invention.

What is claimed is:

1. A silver-copper composite conductive paste capable of being sintered at a low temperature, comprising, by weight, the following components:
   60% of micro-copper particles;
   20% of nano-silver sheets;
   10% of nano-silver particles; and
   10% of an organic carrier;
   wherein, the nano-silver sheets are flake-like, have a plane mean diameter of 100-2000 nm and a mean thickness of 5-500 nm, and the ratio of a flake-like plane diameter to a thickness of the nano-silver sheets is greater than 2; and the organic carrier mainly comprises 1, 2 propylene glycol.

2. The silver-copper composite conductive paste capable of being sintered at a low temperature according to claim 1, wherein the micro-copper particles are spherical and have a mean particle size of 1-10 μm.

3. The silver-copper composite conductive paste capable of being sintered at a low temperature according to claim 1, wherein the nano-silver particles are spherical and have a mean particle size of 1-100 nm.

4. The silver-copper composite conductive paste capable of being sintered at a low temperature according to claim 1, wherein the organic carrier further comprises one or more of an organic resin, a rheological agent and a surface active agent, and a weight percentage of the one or more of the organic resin, the rheological agent and the surface active agent in the organic carrier is 0-3%.

5. The silver-copper composite conductive paste capable of being sintered at a low temperature according to claim 1, wherein the mean particle size of the nano-silver particles is 3-8 nm.

6. A preparation method of the silver-copper composite conductive paste capable of being sintered at a low temperature according to claim 1, comprising the following steps:
   weighing, according to weight percentages, the micro-copper particles, the nano-silver sheets, the nano-silver particles and the organic carrier, adding the micro-copper particles, the nano-silver sheets and the nano-silver particles into the organic carrier, and uniformly grinding with a mortar or a three-roller mill to obtain the silver-copper composite conductive paste capable of being sintered at a low temperature.

7. A method of packaging a semiconductor device with the silver-copper composite conductive paste capable of being sintered at a low temperature according to claim 1, comprising:
   applying the silver-copper composite conductive paste on a chip of the semiconductor device; and sintering the applied paste by a hot-pressing process under a pressure of 0.1 MPa-1 MPa, at a temperature of 180-250° C., for 15-30 min, followed by holding for 10 min.

* * * * *